United States Patent
Cho et al.

(12) 
(10) Patent No.: US 6,651,451 B2
(45) Date of Patent: Nov. 25, 2003

(54) VARIABLE CAPACITY REFRIGERATION SYSTEM WITH A SINGLE-FREQUENCY COMPRESSOR

(75) Inventors: Young T. Cho, Cherry Hill, NJ (US); Cheolho Bai, Taegu (KR)

(73) Assignee: Vai Holdings, LLC, Phoenixville, PA (US)

( * ) Notice: Subject to any disclaimer, the term of this patent is extended or adjusted under 35 U.S.C. 154(b) by 30 days.

(21) Appl. No.: 10/131,564

(22) Filed: Apr. 23, 2002

(65) Prior Publication Data

US 2003/0196445 A1 Oct. 23, 2003

(51) Int. Cl.$^7$ ............................................. F25B 49/00
(52) U.S. Cl. ............................................. 62/197; 62/5
(58) Field of Search ............................. 62/5, 197, 498

(56) References Cited

U.S. PATENT DOCUMENTS

| | | | |
|---|---|---|---|
| 4,589,060 A | * 5/1986 | Zinsmeyer | 700/28 |
| 5,226,472 A | * 7/1993 | Benevelli et al. | 165/263 |
| 5,247,989 A | * 9/1993 | Benevelli | 165/263 |
| 6,430,937 B2 | * 8/2002 | Cho et al. | 62/5 |

FOREIGN PATENT DOCUMENTS

WO          WO 01/29491 A1  *  4/2001

* cited by examiner

*Primary Examiner*—Melvin Jones
(74) *Attorney, Agent, or Firm*—Ostrolenk, Faber, Gerb & Soffen, LLP

(57) ABSTRACT

A variable capacity refrigeration system which does not require a costly inverter compressor and does not exhibit low energy efficiency at high capacity. The system employs a constant speed compressor that operates continuously when the system is energized, irrespective of the heat load, and a refrigerant bypass path including a secondary expansion device, a heat exchanger, and a flow control device which is operable to permit a portion of the refrigerant exiting from the condenser to flow through the bypass path to an inlet of the compressor when the heat load is below a predetermined threshold, whereby the heat exchanger operates as a secondary evaporator, and to prevent refrigerant exiting from the condenser from flowing through the bypass path to the compressor inlet when the heat load is not below the predetermined threshold. In one embodiment, the flow control device is further operable to permit a portion of the refrigerant exiting from the compressor to flow through the bypass path to the primary evaporator through the primary expansion device when the heat load is not below the predetermined threshold, whereby the heat exchanger operates as a secondary condenser. In several embodiments, a pressure differential is maintained between the refrigerant in the heat exchanger and the evaporator. The pressure differential is accommodated by a vacuum generating device such as a vortex generator, a venturi or the like, or by a flow restrictor such as a capillary tube. In several embodiments, the heat exchanger is thermally coupled to the compressor to remove heat from the refrigerant as it flows through the compressor.

67 Claims, 15 Drawing Sheets

VARIABLE CAPACITY REFRIGERATION SYSTEM WITH A SINGLE-FREQUENCY COMPRESSOR

FIELD OF THE INVENTION

The present invention relates generally to a high efficiency refrigeration system and, more specifically, to a refrigeration system utilizing a single-frequency compressor without ON-OFF operation for variable thermal load for increasing the overall efficiency of a refrigeration system.

BACKGROUND OF THE INVENTION

FIG. 1 is a block diagram of a conventional refrigeration system, generally denoted at 10. The system includes a compressor 12, a condenser 14, an expansion device 16 and an evaporator 18. The various components are connected together via copper tubing such as indicated at 20 to form a closed loop system through which a refrigerant such as R-12, R-22, R-134a, R-407c, R-410a, ammonia, carbon dioxide or natural gas is cycled.

The main steps in the refrigeration cycle are compression of the refrigerant by compressor 12, heat extraction from the refrigerant to the environment by condenser 14, throttling of the refrigerant in the expansion device 16, and heat absorption by the refrigerant from the space being cooled in evaporator 18. This process, sometimes referred to as a vapor-compression refrigeration cycle, is used in air conditioning systems, which cool and dehumidify air in a living space, or vehicle (e.g., automobile, airplane, train, etc.), in refrigerators and in heat pumps.

FIG. 2 shows the temperature-entropy curve for the vapor compression refrigeration cycle illustrated in FIG. 1. The refrigerant exits evaporator 18 as a superheated vapor at evaporator pressure (Point 1), and is compressed by compressor 12 to a very high pressure. The temperature of the refrigerant also increases during compression, and it leaves the compressor as superheated vapor at condenser pressure (Point 2).

A typical condenser comprises a single conduit formed into a serpentine-like shape with a plurality of rows of conduit lying in a spaced parallel relationship. Metal fins or other structures which provide high heat conductivity are usually attached to the serpentine conduit to maximize the transfer of heat between the refrigerant passing through the condenser and the ambient air. As the superheated refrigerant gives up heat in the upstream portion of the condenser, the superheated vapor becomes a saturated vapor (Point 2a), and after losing further heat as it travels through the remainder of condenser 14, the refrigerant exits as subcooled liquid (Point 3).

As the subcooled liquid refrigerant passes through expansion device 16, its pressure is reduced, and it becomes a liquid-vapor mixture comprised of approximately 20% vapor and 80% liquid. Also, its temperature drops below the temperature of the ambient air as it goes through the expansion device (Point 4 in FIG. 2).

Evaporator 18 physically resembles the serpentine-shaped conduit of the condenser. Air to be cooled is exposed to the surface of the evaporator where heat is transferred to the refrigerant. As the refrigerant absorbs heat in evaporator 18, it becomes a superheated vapor at the suction pressure of the compressor and reenters the compressor thereby completing the cycle (Point 1 in FIG. 2).

One of the challenges in the design and operation of an air-conditioning or refrigeration system is the variation of thermal load over time. The system becomes tremendously inefficient if it is repeatedly turned ON and OFF because there is a significant energy loss associated with the start-up of a compressor. In order to avoid the frequent ON-OFF operations, an inverter compressor is used, which is essentially a variable-speed compressor. Instead of cycling the compressor on and off, the frequency is varied depending on the required thermal load.

FIGS. 3 and 4 show typical performance curves of heat absorption at the evaporator and EER (energy efficiency ratio) versus frequency. FIG. 3 demonstrates the benefit of the inverter-type compressor, which provides 17% more cooling capacity when the frequency increases from the base frequency of 60 Hz to 80 Hz. Furthermore, the cooling capacity decreases by 40% when the frequency decreases from 60 to 30 Hz, an excellent performance from the point of the thermal load variation.

However, the additional cooling capacity of 17% at 80 Hz has its price: there is a severe penalty in the form of a reduced efficiency. As depicted in FIG. 4, there is 18% drop in the EER when the frequency increased from 60 to 80 Hz. Furthermore, the cost of an inverter compressor is often one-third of an air-conditioning or refrigeration system, almost prohibitively expensive for many applications such as room air-conditioners. Thus, a need clearly exists for a way to achieve the benefits of an inverter compressor without the cost and EER penalty.

SUMMARY OF THE INVENTION

It is among the objects of this invention:

to provide a refrigeration system using a single-speed compressor which provides the variable cooling capacity of systems using inverter compressors without the disadvantages of such systems;

to provide a refrigeration system in which the compressor can be operated continuously irrespective of heat load;

to provide a variable cooling capacity refrigeration system which does not rely on a costly inverter compressor;

to provide a variable cooling capacity refrigeration system which does not exhibit a significant drop in EER as cooling capacity increases;

to provide a variable cooling capacity refrigeration system suitable for use in room air conditioners;

to provide a method of operating a refrigeration system with increased SEER;

to provide a method of operating a refrigeration system having a single-speed compressor which provides variable cooling capacity without the disadvantages of known variable cooling capacity systems; and to provide a method of operating a refrigeration system in which a single speed compressor can be run continuously but which provides variable cooling capacity.

SEER, or system energy efficiency ratio, is defined as the ratio of the sum of heat absorption times operation period to the sum of compressor work times operation period. EER (energy efficiency ratio) represents the instantaneous efficiency of a refrigeration system, whereas SEER represents the efficiency of a refrigeration system over an extended period. Use of a continuously operating fixed speed compressor in a variable cooling capacity system has been found to provide improvements in SEER.

According to a first aspect of the invention, the objects of the invention are achieved by providing a variable capacity refrigeration system having condenser means, expansion means, evaporator means and a refrigerant compressor means that operates continuously at a fixed speed when the system is energized, irrespective of the heat load, a refrigerant bypass path that includes secondary expansion means, heat exchanger means, and flow control means. When the heat load is below a predetermined high heat load threshold, the flow control means permits a portion of the refrigerant exiting from the condenser means to flow through the bypass path to an inlet of the compressor means, whereby the heat exchanger means operates as a secondary evaporator means. When the heat load is not below the high heat load threshold, the flow control means prevents refrigerant exiting from the condenser means from flowing through the bypass path to the compressor means.

According to a second aspect of the invention, the objects of the invention are achieved by providing a variable capacity refrigeration system having a condenser, an expansion device, an evaporator and a compressor that operates continuously at a fixed speed when the system is energized, irrespective of the heat load, a refrigerant bypass path that includes a secondary expansion device, a heat exchanger, and a flow control device. When the heat load is above a predetermined high heat load threshold, the flow control device is operable to provide a first cooling capacity. When the heat load is not above the high heat load threshold, the cooling capacity is reduced.

In one embodiment the reduced cooling capacity is provided by diverting a portion of the refrigerant exiting from the condenser to flow through the bypass path to an inlet of the compressor whereby the heat exchanger provides additional subcooling for the condenser. When the heat load is not below the predetermined threshold, the flow control device prevents refrigerant exiting from the condenser to flow through the bypass path to the compressor.

In a variation of the above, the heat exchanger removes heat from the refrigerant flowing through the compressor.

According to a third aspect of the invention, the objects of the invention are achieved by providing a method of operating a refrigeration system to improve the SEER, in which a compressor is operated continuously at a constant speed when the system is energized, irrespective of the heat load, in which there is provided a refrigerant bypass path including a secondary expansion device, a heat exchanger, and a flow control device, and operating the flow control device to provide a first cooling capacity when the heat load is above a predetermined high heat load to threshold, and to provide a reduced second cooling capacity when the heat load is not above the high heat load threshold.

Also according to the first, second, and third aspects of the invention, the refrigerant flow through the bypass path may progressively be increased from the minimum level to a maximum level as the heat load decreases below the high heat load threshold.

When the heat exchanger is operating as a secondary evaporator, warm air may be directed to the heat exchanger and chilled air from the heat exchanger may be directed to the condenser.

Also, when the heat exchanger is operating to reduce the cooling capacity, refrigerant pressure in the heat exchanger may be maintained at a higher level than the pressure in the primary evaporator. In that case, a pressure differential accommodating device reduces the pressure of the refrigerant exiting the heat exchanger. The pressure differential accommodating device may be a vacuum generator such as a vortex generator or a venturi tube, or a flow restrictor such as a capillary tube. When there is no pressure differential between the primary evaporator and the heat exchanger, a pressure differential accommodating device does not have to be used.

According to a variation of the invention as described above, the bypass path may be constructed to operate as a secondary condenser and thereby provide increased cooling capacity for high heat loads. In that case, the flow control device is operable to permit a portion of the refrigerant exiting from the compressor to flow through the bypass path to the primary evaporator through the primary expansion device. Also according to this aspect of the invention, the flow of refrigerant from the compressor outlet through the bypass path may progressively increased from a minimum level to a maximum level as the heat load increases above the high heat load threshold. Further, according to this aspect of the invention, a low heat load threshold may also be selected. When the heat load is below the low heat load threshold, the bypass path operates as a secondary evaporator. Between the two thresholds, the system operates as a conventional system.

In another variation according to the first, second, and third aspects of the invention, heat exchanger is configured to remove heat from the refrigerant exiting the compressor instead of as a secondary evaporator Other features and advantages of the invention will become apparent from the following description of the invention which refers to the accompanying drawings.

BRIEF DESCRIPTION OF THE DRAWINGS

Throughout the drawings, like parts are given the same reference numerals.

DETAILED DESCRIPTION OF EMBODIMENTS OF THE INVENTION

Figure 1:
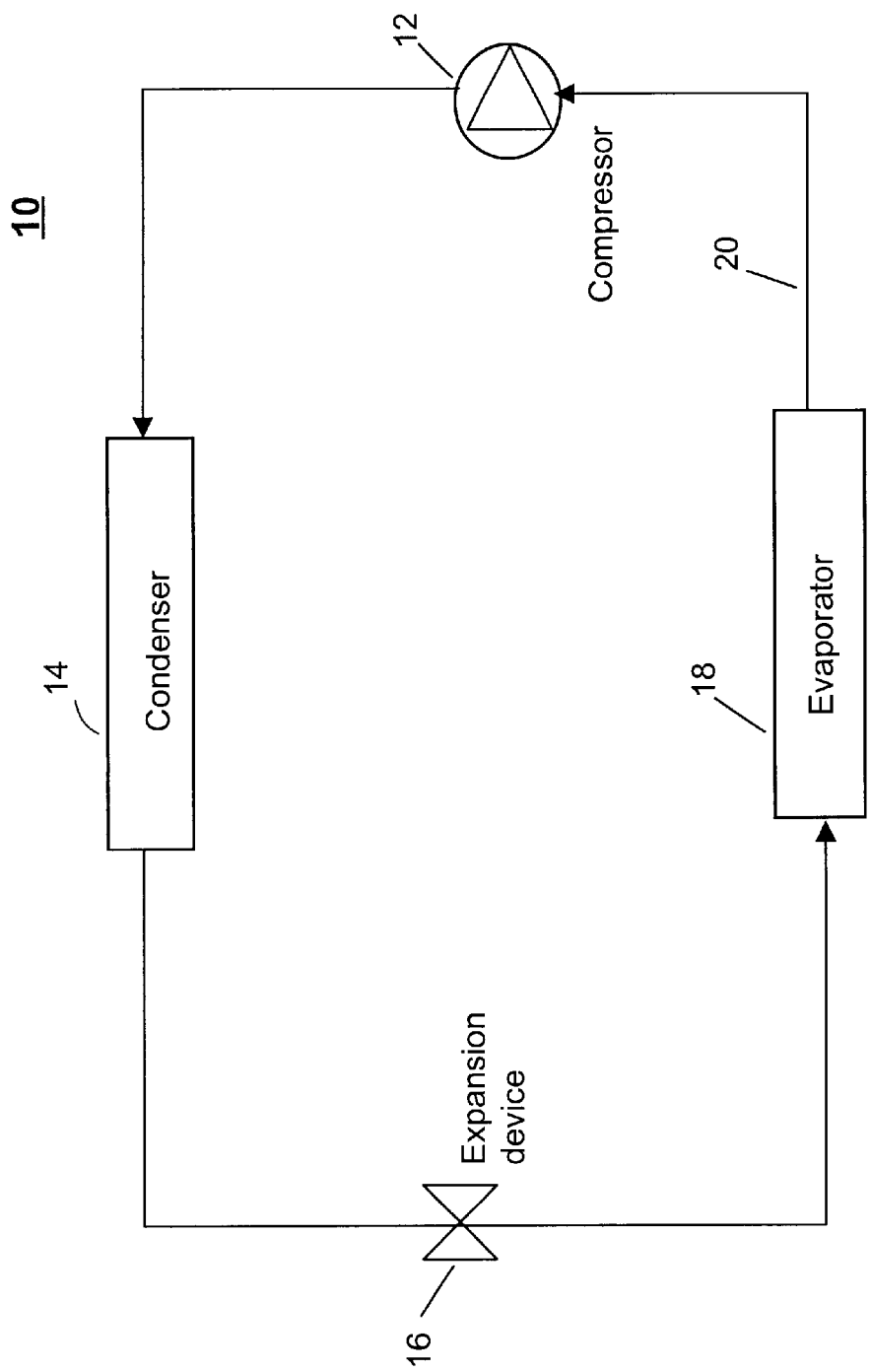
FIG. 1 shows a block diagram of a conventional refrigeration system.
Figure 2:
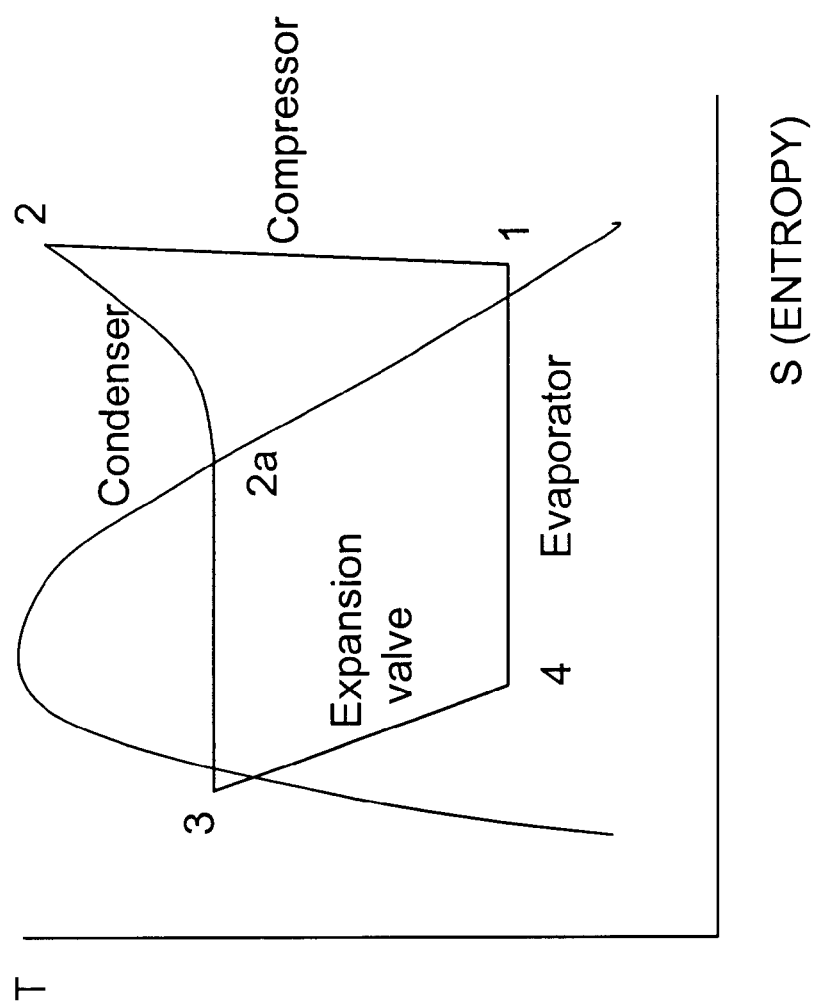
FIG. 2 shows a temperature-entropy curve for the conventional refrigeration system of FIG. 1.
Figure 3:
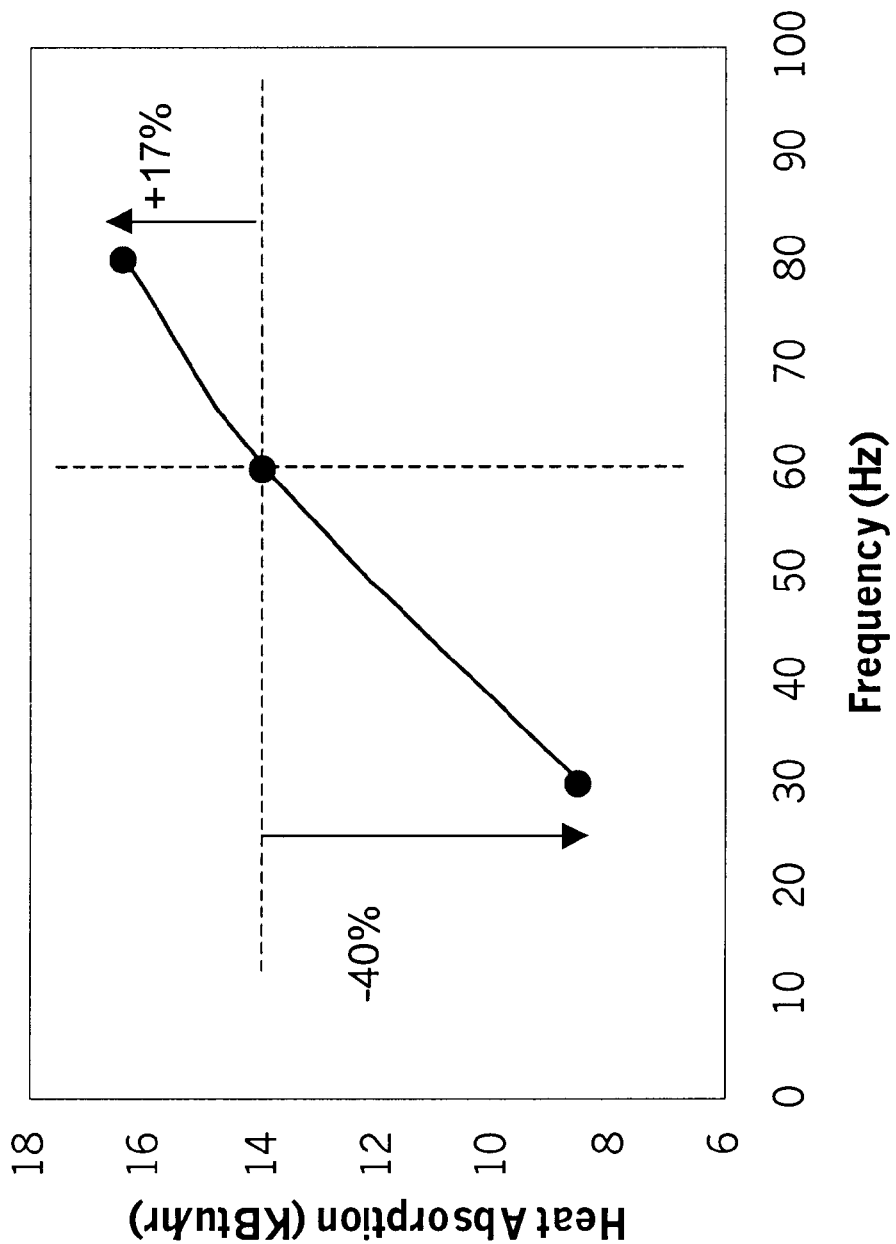
FIG. 3 shows a typical performance curve of a heat absorption vs. frequency for a conventional inverter compressor.
Figure 4:
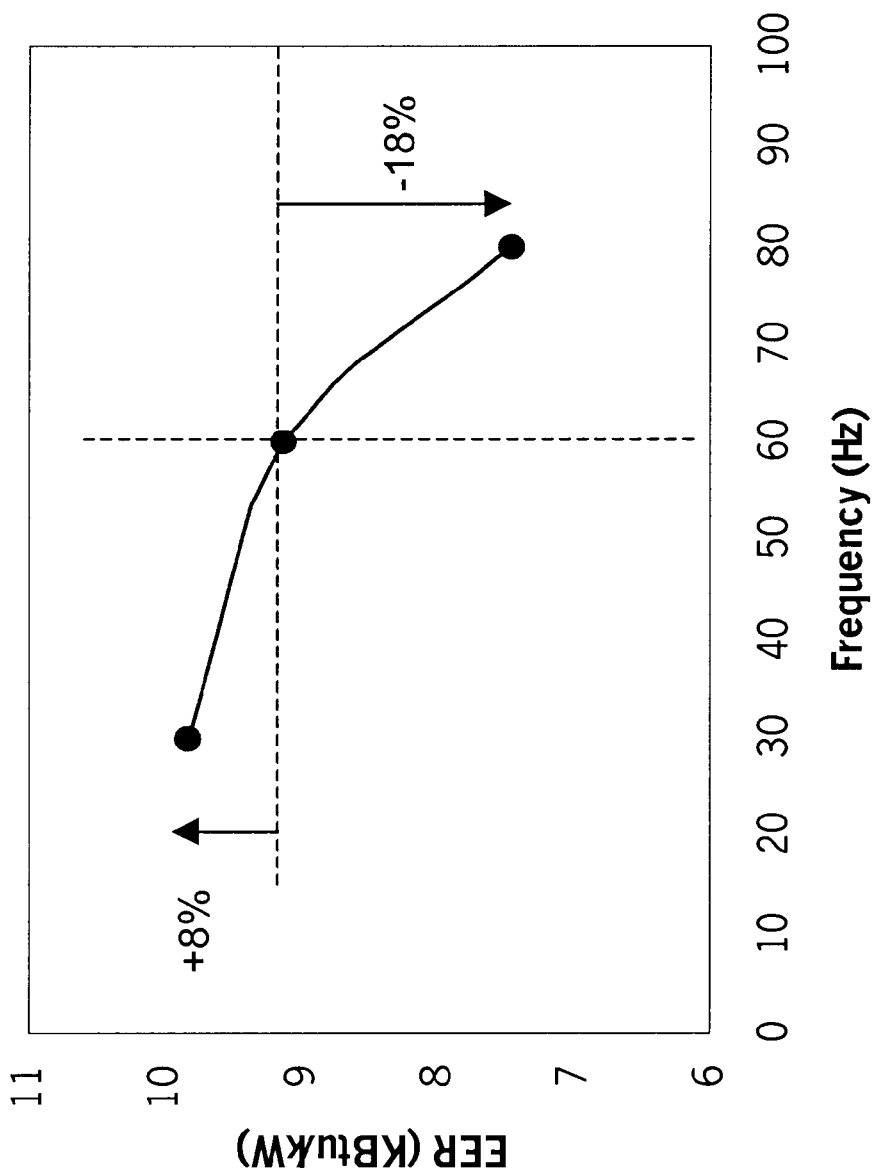
FIG. 4 shows a typical performance curve of an EER vs. frequency for a conventional inverter compressor.
Figure 5:
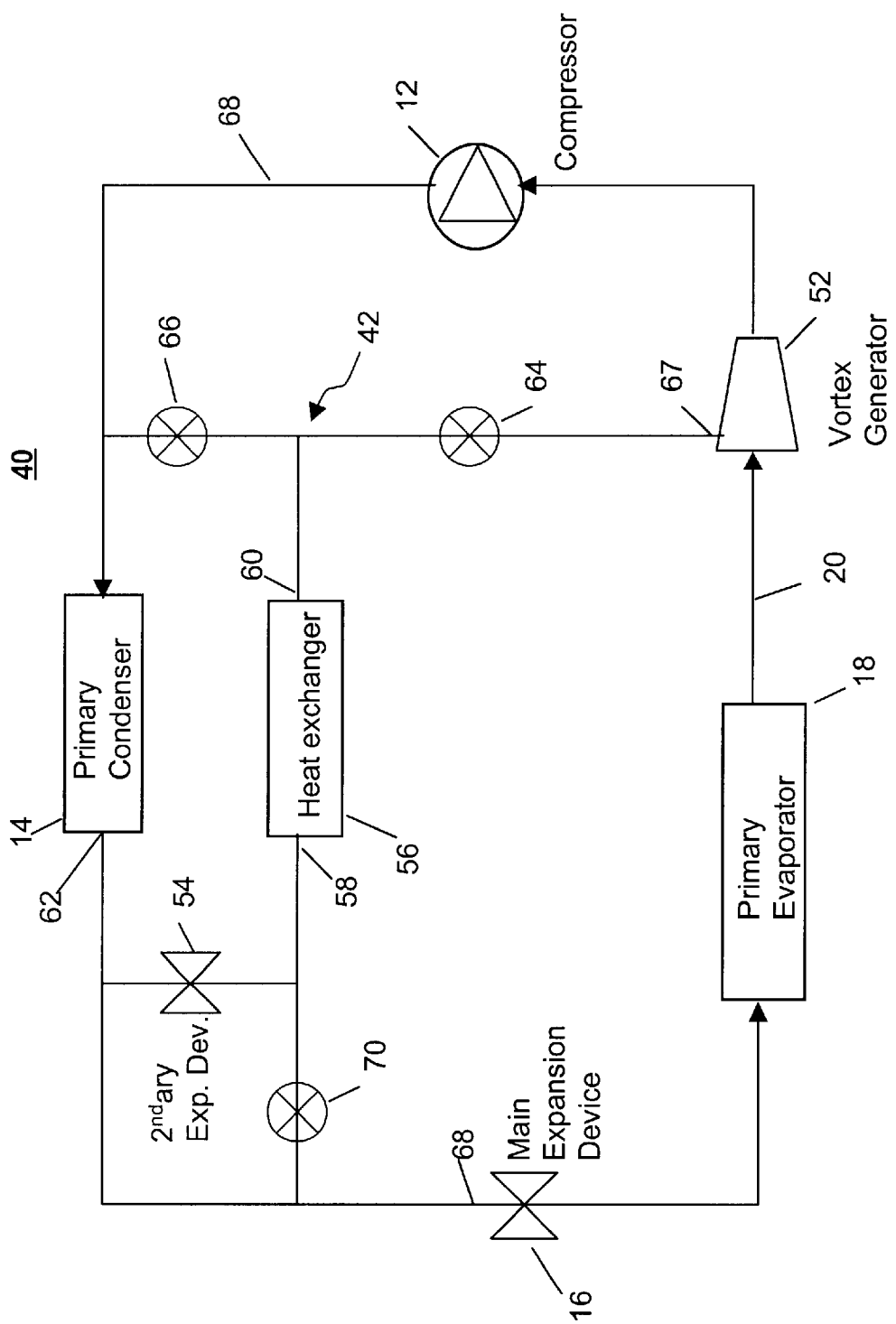
FIG. 5 shows a block diagram of a first embodiment of a variable cooling capacity refrigeration system according the present invention.
Figure 6:
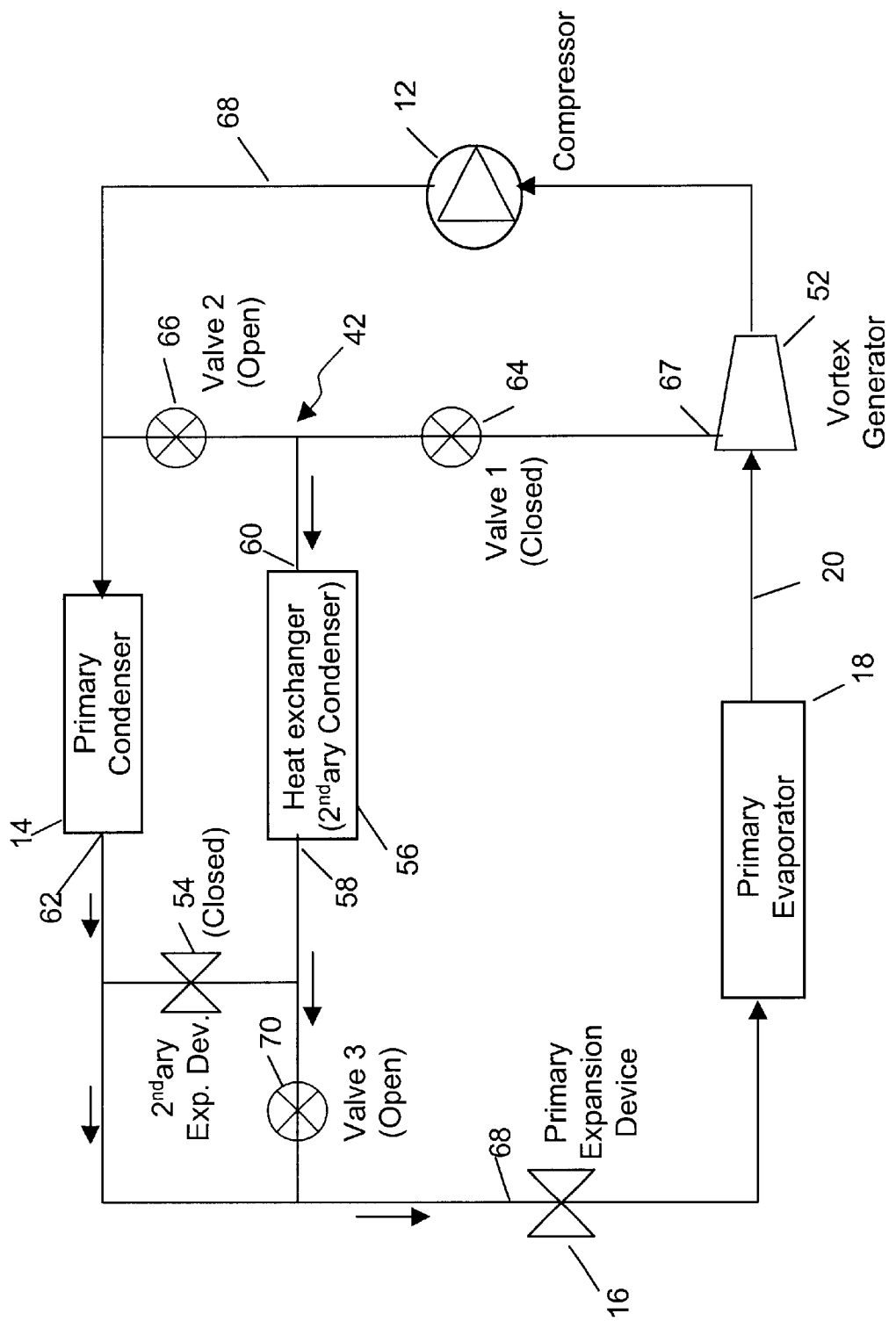
FIG. 6 shows the system of FIG. 5 when it is operating with high cooling capacity.
Figure 7:
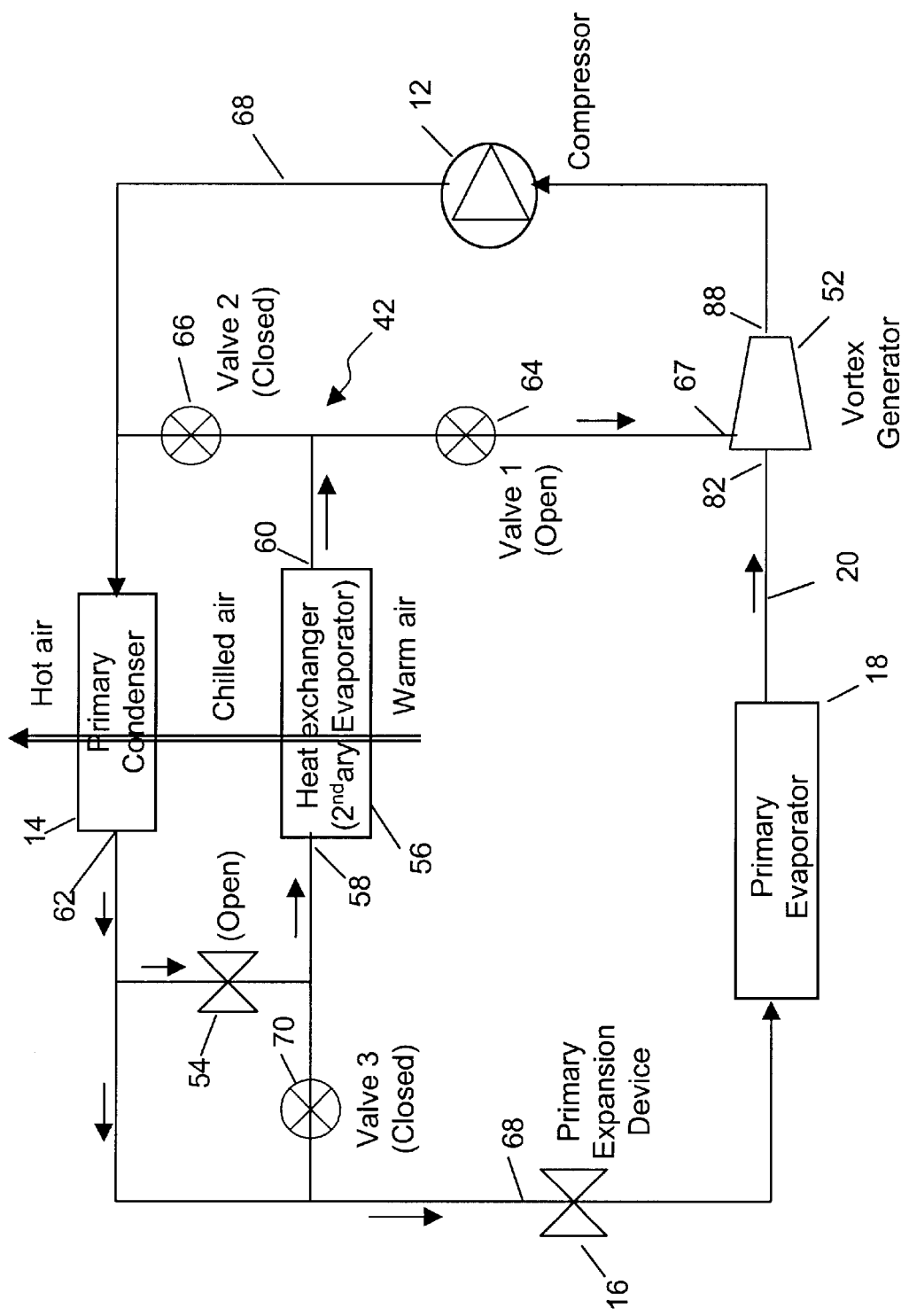
FIG. 7 shows the system of FIG. 5 when it is operating with reduced cooling capacity.

Turning now to FIGS. 5–7, there is illustrated a variable capacity refrigeration system according to a first embodiment of the invention. The system of FIG. 5, generally denoted at 40, includes a compressor 12, a condenser 14, an expansion device 16 and an evaporator 18. The indicated components, which may be identical to those described in connection with FIG. 1, are connected together via copper tubing such as indicated at 20 to form a closed loop system including a pressure differential accommodating device such as a vortex generator 52 or the like, as described below. A refrigerant such as R-12, R-22, R-134a, R-407c, R-410a, ammonia, carbon dioxide or natural gas is cycled through the system. A suitable combination of refrigerants may also be employed, as well as regeneration, as disclosed, for example, in our U.S. Pat. No. 6,250,086 and 6,293,108, the contents of which are hereby incorporated by reference.

Compressor 12 is continuously operated by a suitable power source such as an electric motor at a constant speed, for example, 60 Hz.

A bypass path generally denoted at 42 provides the desired variable cooling capacity. This is comprised of a secondary expansion device 54 and a heat exchanger 56, which is constructed similarly to condenser 14, but is smaller than the primary condenser since the flowrate in the bypass is less than one-fourth of that in the primary condenser. Vortex generator 52 may also be considered part of bypass path 42, as described below.

A first port 58 of heat exchanger 56 is connected by secondary expansion device 54 to an outlet 62 of primary condenser 14. Secondary expansion device 54 is of conventional design, and is arranged to operate between open and closed positions by means of a suitable controller responsive to heat load (not illustrated).

A second port 60 of heat exchanger 56 is connected through a valve 64 to a high pressure inlet 67 of vortex generator 52. Heat exchanger port 60 is also connected by a second valve 66 to the outlet 68 of compressor 12, and heat exchanger port 58 is also connected to an inlet 68 of primary expansion device 16 by a third valve 70. Valves 64, 66 and 70 may be of any suitable construction but are arranged to be continuously adjustable between the fully open and fully closed positions by a suitable controller responsive to the heat load (not illustrated). The valves may alternatively be adjustable in steps, and other adjustable flow control devices may also be employed.

According to the invention, the flow of refrigerant through secondary expansion device 54 and valves 64, 66 and 70 determines the function performed by heat exchanger 56. In particular, as illustrated in FIG. 6, heat exchanger 56 can function as a secondary condenser to increase cooling capacity without the need to run compressor 12 at a higher speed. To accomplish this, secondary expansion device 54 and valve 64 are completely closed, and valves 66 and 70 are opened. This allows a portion of the compressed refrigerant at compressor outlet 68 to flow through valve 66, into port 60 of heat exchanger 56, out through port 58, and then through valve 70 to inlet 68 of primary expansion device 16. As a consequence, the total surface of the condenser is effectively increased, and the condenser pressure is decreased, reducing the required pressure rise across the compressor. This reduces the compressor work, thus increasing EER. Furthermore, the increased condenser surface increases the subcooling of the refrigerant, which increases the percentage of liquid refrigerant after the primary expansion device. Hence, the heat absorption at the evaporator increases, increasing the cooling capacity.

Conversely, when the heat load is low, and less cooling capacity is required, the system may be configured with secondary expansion device 54 and valve 64 in the open positions, and valves 66 and 70 in the closed positions. As a consequence, part of the refrigerant flowing at outlet 62 of condenser 14 is diverted through expansion device 54 to port 58 of heat exchanger 56 which now functions as a secondary evaporator. The refrigerant outflow from heat exchanger 56 at port 60 then passes through valve 64 to the high pressure inlet 67 of vortex generator 52.

As will be understood by those skilled in the art, heat is transferred from the refrigerant flowing through condenser 14 by air directed over its heat transfer surfaces from the environment outside the space being cooled. In the case of heat exchanger 56 operating as a secondary condenser, air flow from the environment is directed separately to both condenser 14 and heat exchanger 56 (the air flow paths being omitted from FIG. 6 in the interest of simplicity). On the other hand, in FIG. 7, when heat exchanger 56 is operating as a secondary evaporator, the air flowing over its heat transfer surfaces is chilled, and this chilled air, rather than air from the environment, is directed over the heat transfer surfaces of condenser 14 as illustrated schematically in FIG. 7. Passage of the chilled air through the primary condenser, increases heat transfer from the refrigerant in the primary condenser, and the condenser pressure decreases, reducing the required pressure rise across the compressor.

Another reason for the condenser pressure decreases is that the amount of heat absorption at the evaporator is less with bypass, a phenomenon which reduces the heat rejection requirement at the condenser. As a result, the condenser pressure also decreases. Hence, the decrease in the compressor work is bigger than the drop in the heat absorption at the evaporator, providing an increase in EER.

The diversion of refrigerant from primary evaporator 18 when heat exchanger 56 operates as a secondary evaporator reduces the cooling capacity of primary evaporator 18, and thus, of the overall system, without the need to shut down compressor 12, or to use an economically unattractive inverter compressor. On the other hand, because the refrigerant diverted through heat exchanger 56 is used to cool the air flowing over primary condenser 14, the condenser operates more efficiently. The result is to produce additional sub-cooling of the refrigerant in condenser 14, and this increases the percentage of liquid refrigerant entering the evaporator. Although the total amount of the refrigerant at the evaporator is reduced due to the bypass, the increased liquid percentage helps the operation of the evaporator. Hence, the decrease in the compressor work due to the decreased condenser pressure is bigger than the drop in the heat absorption at the evaporator, again yielding increased EER.

As the positioning of valves 64, 66 and 70, and of secondary expansion device 54 are related to heat load, a threshold transition point must be selected. A principal factor entering into selection of the transition point is the thermal load as indicated by temperature and humidity of the environment outside the space being cooled. It is found that good results are obtained if the threshold is selected to be about 85% of the maximum load. As the thermal load decreases further, the amount of the refrigerant in the bypass path can be progressively increased up to the fully open position of valve 64 to further reduce the heat absorption at the evaporator.

Still referring to FIG. 7, the pressure of the refrigerant flowing through heat exchanger 56 when it functions as a secondary evaporator can advantageously be made higher than the refrigerant pressure through primary evaporator 18, by proper selection of the secondary expansion valve 54 and the valve 64.

In the embodiment of FIG. 7, vortex generator 52 is used to accommodate this pressure differential. Vacuum generators which have no moving parts are particularly suitable for use as the pressure differential accommodating device according to this invention. Such devices, which include vortex generators and venturi tubes, rely on geometry and fluid dynamics to create pressure differential.

Figure 8:
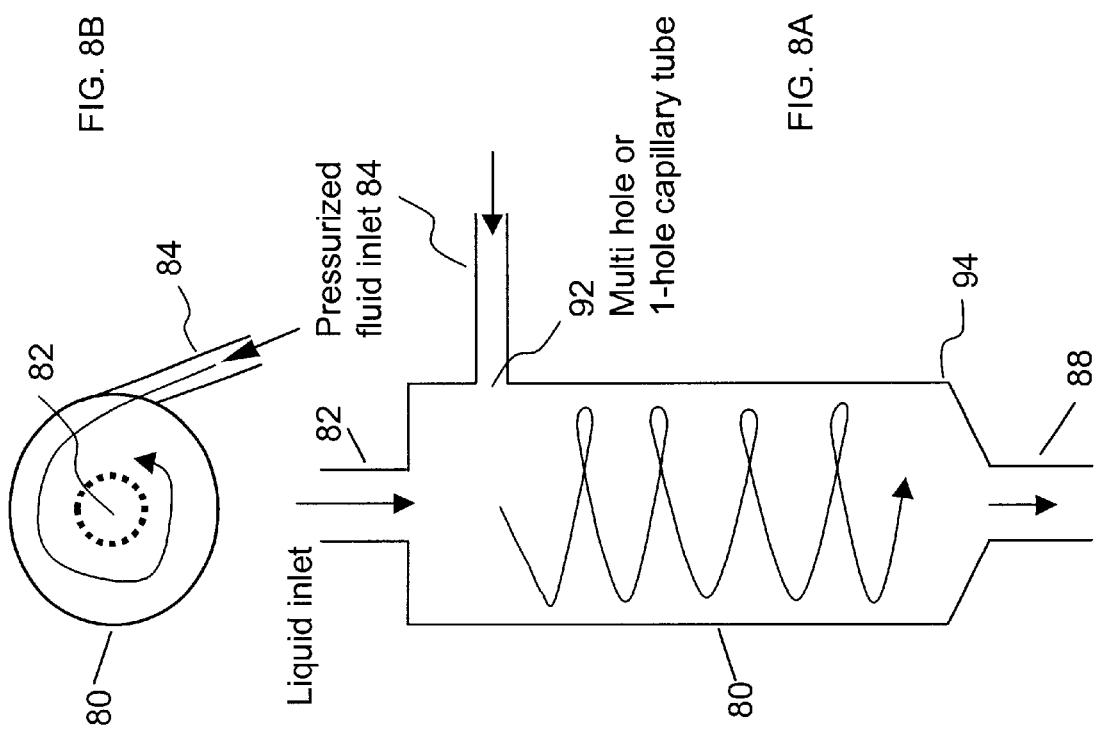
FIGS. 8A and 8B illustrate the construction of a vortex generator which may be used as a pressure differential accommodating device according to the invention.

The construction of vortex generator 52 used in the embodiment of FIGS. 5–7 is shown schematically in FIGS. 8A and 8B. The design is derived from the so-called vortex tube, a known device which converts an incoming flow of compressed gas into two outlet streams—one stream hotter than and the other stream colder than the temperature of the gas supplied to the vortex tube. The conventional version of a vortex tube, e.g., used for fluid separation in refrigeration systems, is illustrated in our U.S. Pat. No. 6,250,086, which is hereby incorporated herein by reference.

As illustrated in FIGS. 8A and 8B, a suitable vortex generator is comprised of a tubular body 80, with an axial low pressure inlet 82 and a tangential high pressure inlet 84, which is advantageously a capillary tube having a 1 mm internal diameter at an inlet end 92, and an outlet 88 at an opposite outlet end 94. The interior construction of tube 80 at the inlet end is such that a high pressure gas stream entering tangential inlet 84 travels along a helical path toward the outlet 88. This produces a strong vortex flow in tube 80, and a radial pressure differential due to the centrifugal force created by the vortex flow forces the fluid radially outward and produces high pressure at the periphery and low pressure at the axis. The low pressure allows fluid drawn in through axial inlet 82 to mix with the high pressure helical stream and to exit with it through outlet 88.

Vortex generators are the subject of a copending U.S. provisional patent application entitled USE OF A VORTEX GENERATOR TO GENERATE VACUUM, filed in the names of Young Cho, Cheolho Bai, and Joong-Hyoung Lee on Feb. 11, 2002, the contents of which is hereby incorporated by reference. Further information concerning vortex generator 52 may be found in this application.

The pressure at outlet 88 of vortex generator 52 will normally be higher than the pressure at low pressure inlet 82, but lower than the pressure high pressure inlet port 67. This is achieved by proper selection of the size of capillary tube 84 at the inlet of the vortex generator 52. The purpose of using high pressure is to raise the suction pressure of the compressor as high as possible so that the required pressure rise can be as small as possible to reduce the compressor work. Mixing of two-different pressure vapors inside a vortex generator produces a higher outlet pressure at the exit of the vortex generator due to the contribution from the kinetic energy of the vortex flow at the exit.

In the system configuration illustrated in FIG. 7, the high pressure tangential stream is provided to inlet 67 from valve 64, and the low pressure axial stream is provided to port 82 from the outlet 72 of primary evaporator 18. Using a vacuum generating device such as vortex generator 52 as a pressure differential accommodating device makes it possible to mix the refrigerant streams existing primary evaporator 18 and heat exchanger 56 quite conveniently.

Figure 9:
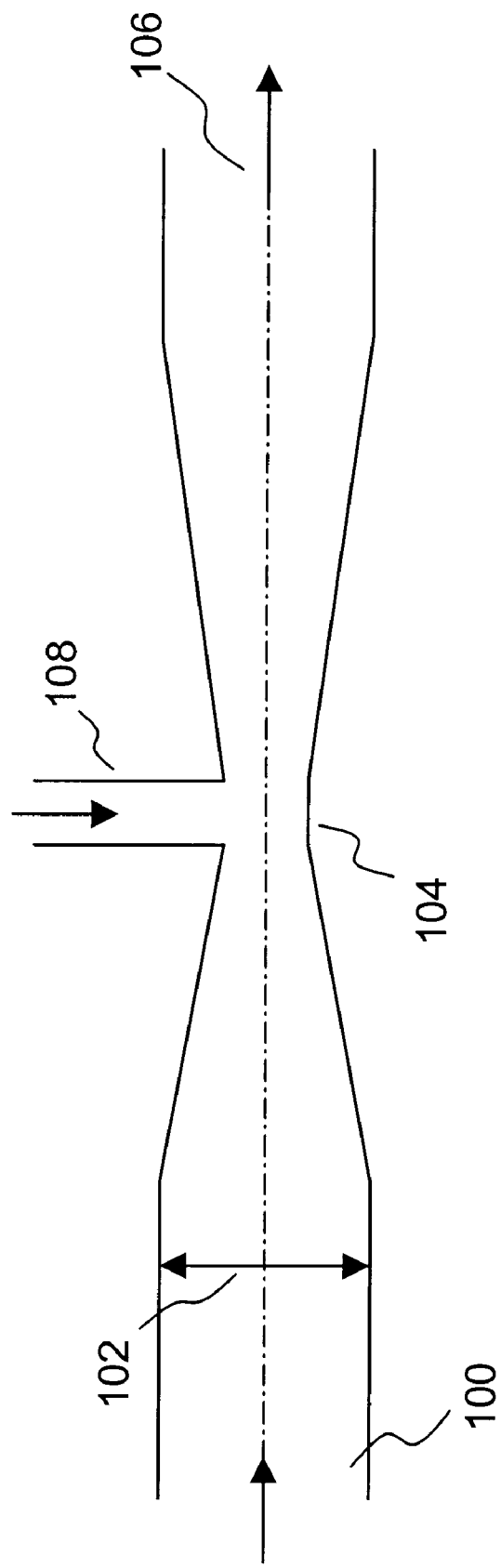
FIG. 9 illustrates the construction of a venturi which may be used instead of the vortex generator shown in FIGS. 8A and 8B.

Other devices which rely on geometry and fluid dynamics may also be used to accommodate the pressure differential between the refrigerant in primary evaporator 18 and heat exchanger 56 when the latter operates as a secondary evaporator. For example, a device operating on the principle of a venturi tube may also be used. In such a device, as illustrated in FIG. 9, a high pressure fluid stream (here, the refrigerant flowing through heat exchanger 56), enters axially into an elongated tube 100 having an interior diameter 102 which decreases gradually to a point of minimum diameter 104 and thereafter increases gradually toward an outlet end 106. As the cross-sectional area decreases, the vapor stream is accelerated. According to Bernoulli's principle, the pressure decreases, and reaches a minimum at the so-called "throat" corresponding to the point of minimum diameter 104 where a vacuum is created.

A radial inlet 108 is provided at the low-pressure point. For the system configured as shown in FIG. 7, this is connected to the outlet 72 of evaporator 18, thereby permitting mixture of the liquid refrigerant streams from evaporator 18 and heat exchanger 56 when the latter operates a secondary evaporator.

Yet another possible vacuum generator which can be used as a pressure differential accommodating device is the so-called ejector, sometimes also called a siphon or eductor.

Figure 10:
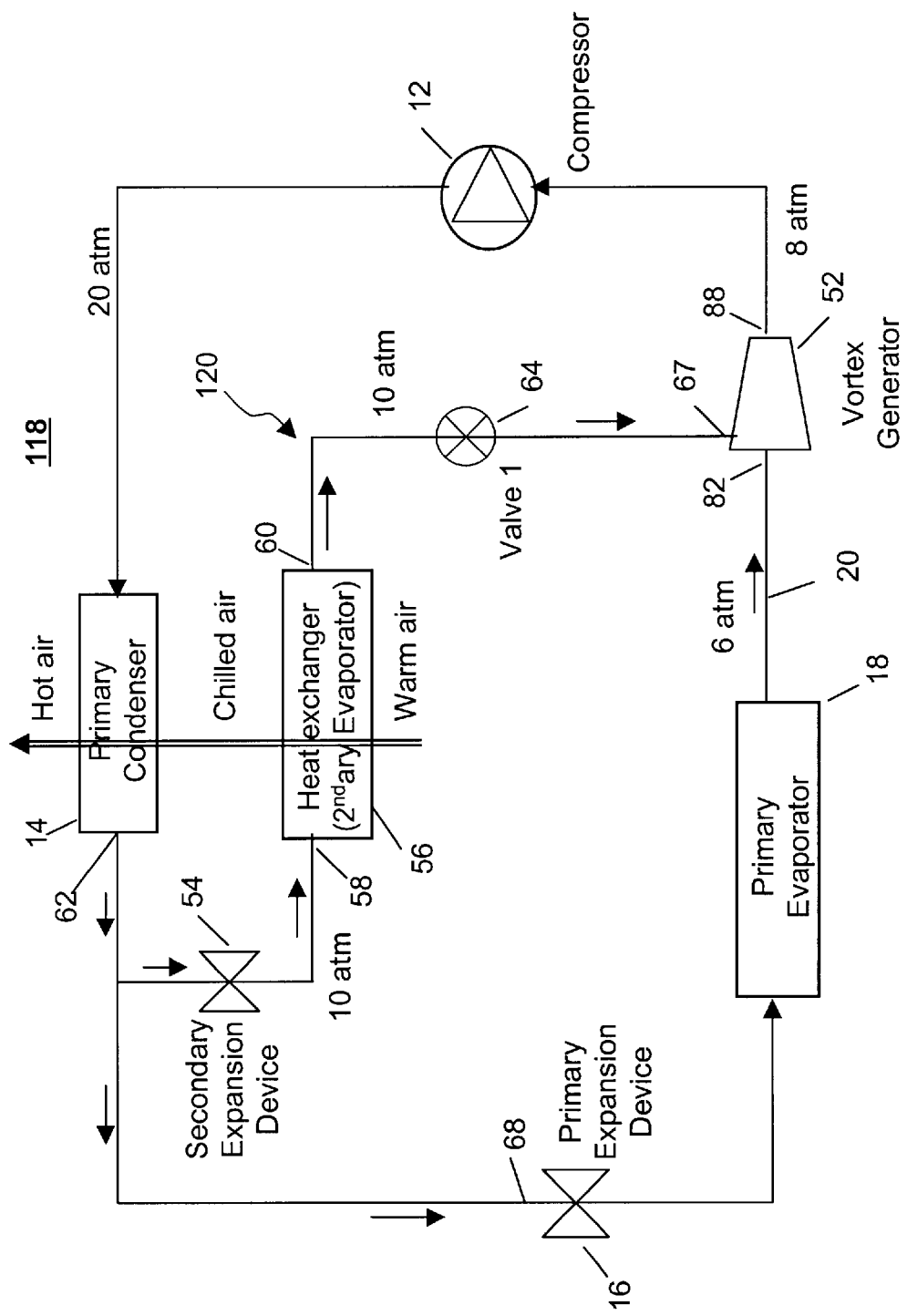
FIG. 10 shows a block diagram of a second embodiment of the invention in which the bypass path is configured to operate only as a secondary evaporator, but not as a secondary condenser.

FIG. 10 illustrates a second embodiment of the invention in which the secondary or bypass refrigerant path provides only reduced cooling capacity and not increased cooling capacity. This embodiment would be advantageous, for example, where the application permits use of a compressor which provides the necessary maximum cooling capacity without further enhancement, and results in a somewhat simpler and less costly system. Specific refrigerant pressures are given in FIG. 10, and also in FIGS. 11–14 discussed below, for the purpose of illustration, for use of R-22 refrigerant.

As illustrated in FIG. 10, the modified system, generally denoted at 118, is similar to that of system 40 illustrated in FIGS. 5–7 except that the bypass path 120 includes only secondary expansion device 54, heat exchanger 56, and valve 64. Valves 66 and 70 (see FIGS. 5–7) are dispensed with. In this system, when reduced cooling capacity is required, secondary expansion device 54 and valve 64 are opened and the system functions in the manner described in connection the FIG. 7, resulting in a higher SEER.

When reduced cooling capacity is not called for, i.e., when the heat load is not less than the predetermined threshold level, secondary expansion device 54 and valve 64 are closed and the system functions as a conventional refrigeration system of the type illustrated in FIG. 1. Again, however, by reducing the cooling capacity when the heat load is below the predetermined threshold, it is not necessary to shut down compressor 12, and a single speed continually operating compressor can be used to provide the benefits of the inverter compressor, resulting in a higher SEER, without the associated disadvantages.

Figure 11:
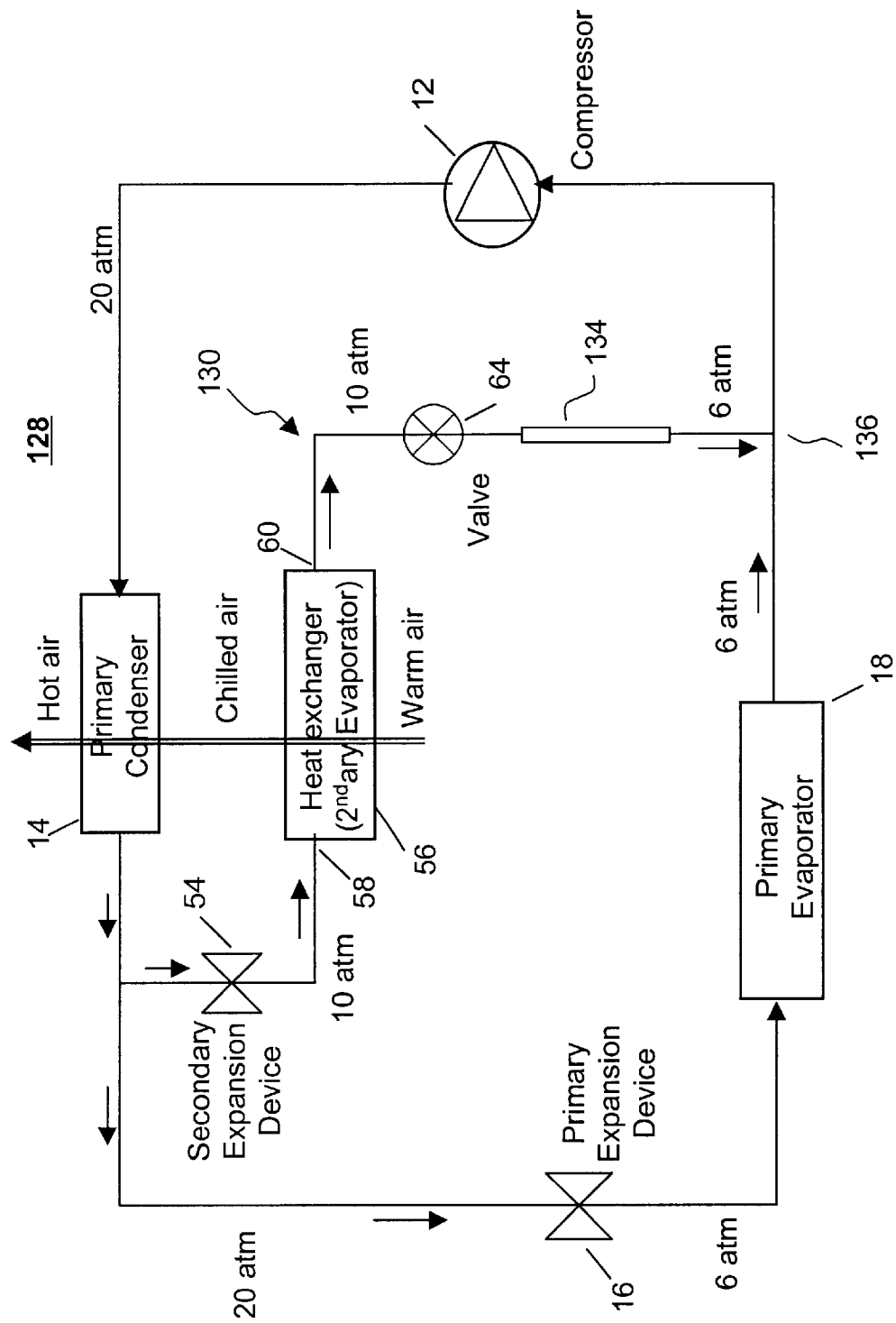
FIG. 11 shows a block diagram of a third embodiment of the invention in which the bypass path is configured as in the second embodiment, but in which a flow restrictor is used as a pressure differential accommodating device instead of a vacuum generator.

A third embodiment of the invention is illustrated in FIG. 11. The system according to the third embodiment, generally denoted at 128, is identical to that of the second embodiment illustrated in FIG. 10 except that bypass path 130 includes a flow restrictor such as a capillary tube 132, instead of a vacuum generating device such as vortex generator 56. Flow restrictor 132 is selected such that the fluid pressure at its outlet end 134 is equal to the pressure of the fluid exiting main evaporator 18, and both fluid streams may be conducted directly to the inlet of compressor 12 through a suitable fitting 136. The pressure differential between heat exchanger 56 when it acts as a secondary evaporator and main evaporator 18 is thus accommodated without the need for a vortex generator or venturi.

A system according to the third embodiment is advantageous in that it does not require a vacuum generating device. However, since the pressure drop across a fixed length capillary tube varies within a small range of values, the third embodiment is best employed when only a narrow range of variable cooling capacity is required, resulting in a higher SEER.

Figure 12:
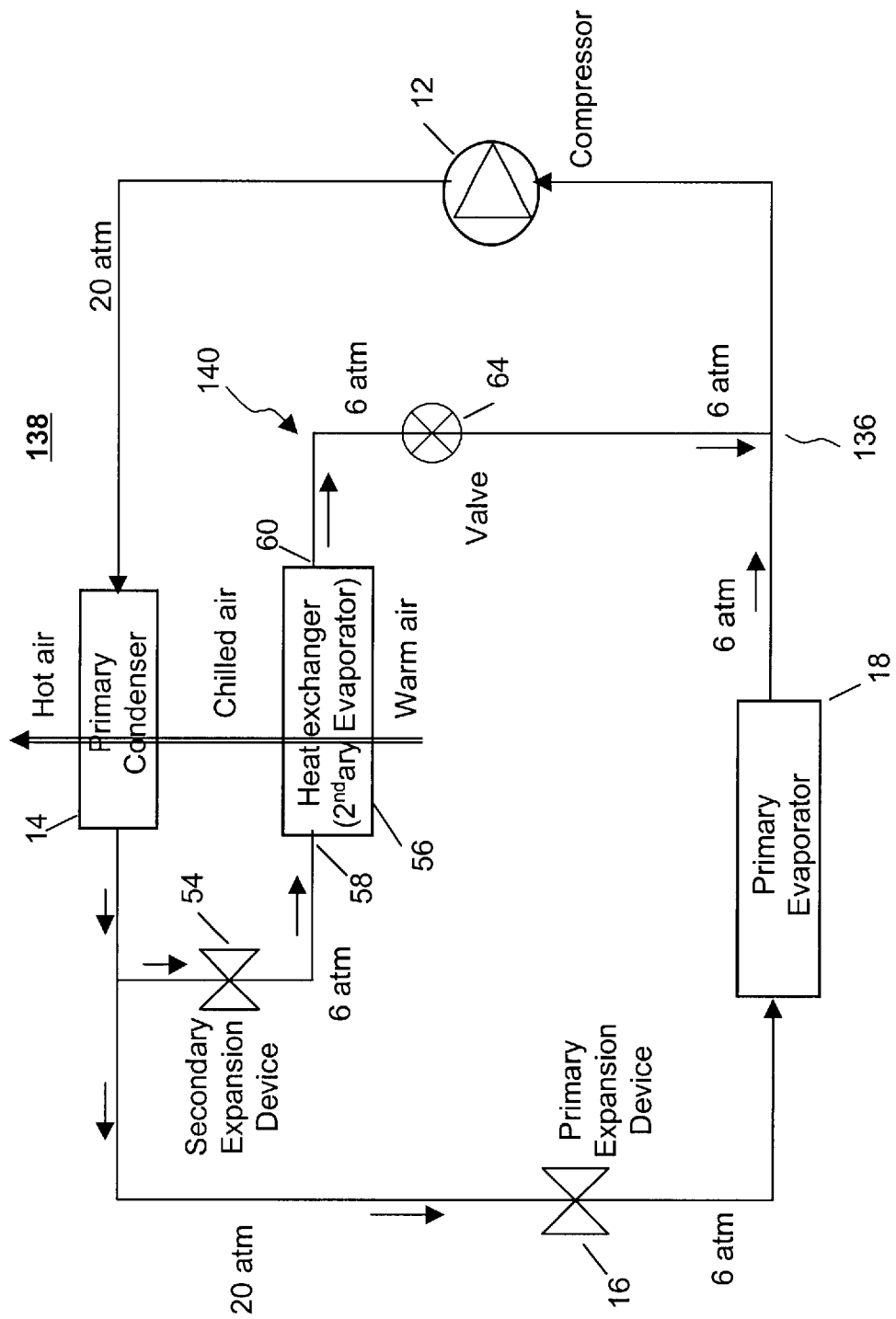
FIG. 12 shows a block diagram of a fourth embodiment of the invention in which the bypass path is configured as in the second and third embodiments, but in which a pressure differential accommodating device is not required.
Figure 13:
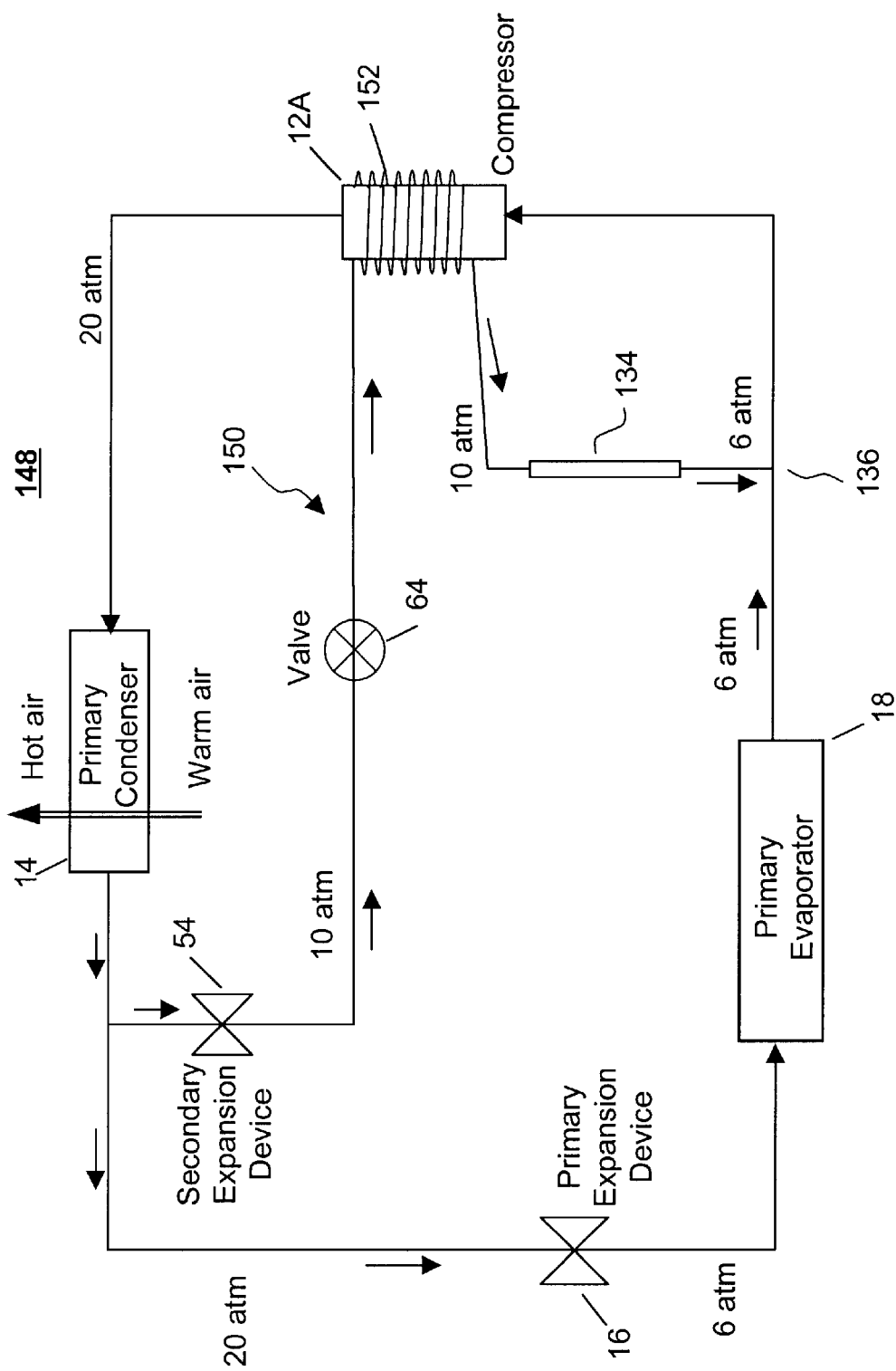
FIG. 13 shows a block diagram of a fifth embodiment of the invention in which the bypass path is configured as in third embodiment, but in which the heat exchanger operates to remove heat from the refrigerant at the compressor instead of at the condenser.

FIG. 12 illustrates a fourth embodiment of the invention generally denoted as 138, in which the pressure at the bypass path is set to be equal to the pressure at the evaporator. For example, for the case of R-22, the pressure at the bypass path is maintained at 6 atm by a proper selection of the secondary expansion valve 54 and valve 64. Since the pressure at the bypass path is equal to that at the evaporator, neither a vacuum generating device nor a capillary tube is needed. This embodiment offers further cost savings due to elimination of the pressure differential accommodating device, resulting in a higher SEER, but the lower compressor inlet pressure results in a lower EER FIG. 13 illustrates a fifth embodiment, generally denoted by 148, in which the pressure at the bypass path is maintained higher than the pressure at the evaporator, for example, in the case of R-22, where the pressure at the bypass path 150 is maintained at 10 atm. The amount of the refrigerant in the bypass path is varied using a valve 64, thus varying the cooling capacity, resulting in a higher SEER. This embodiment uses a heat exchanger coil 152 wrapped around a compressor 12A. To accommodate this, the configuration of the compressor housing is made cylindrical. This embodiment also employs a capillary tube 134 as a pressure differential accommodating device, but it will be appreciated that a vacuum generating device may be used instead.

The low-temperature refrigerant in the coil wrapped around the compressor removes heat from the compressor, thus removing heat from the refrigerant before the refrigerant enters the primary condenser. Cost savings are achieved for this arrangement by eliminating the need for a separate heat exchanger to be used as a secondary evaporator. However, if the compressor housing is not cylindrical, it may not be practical to wrap the coil around the compressor.

Figure 14:
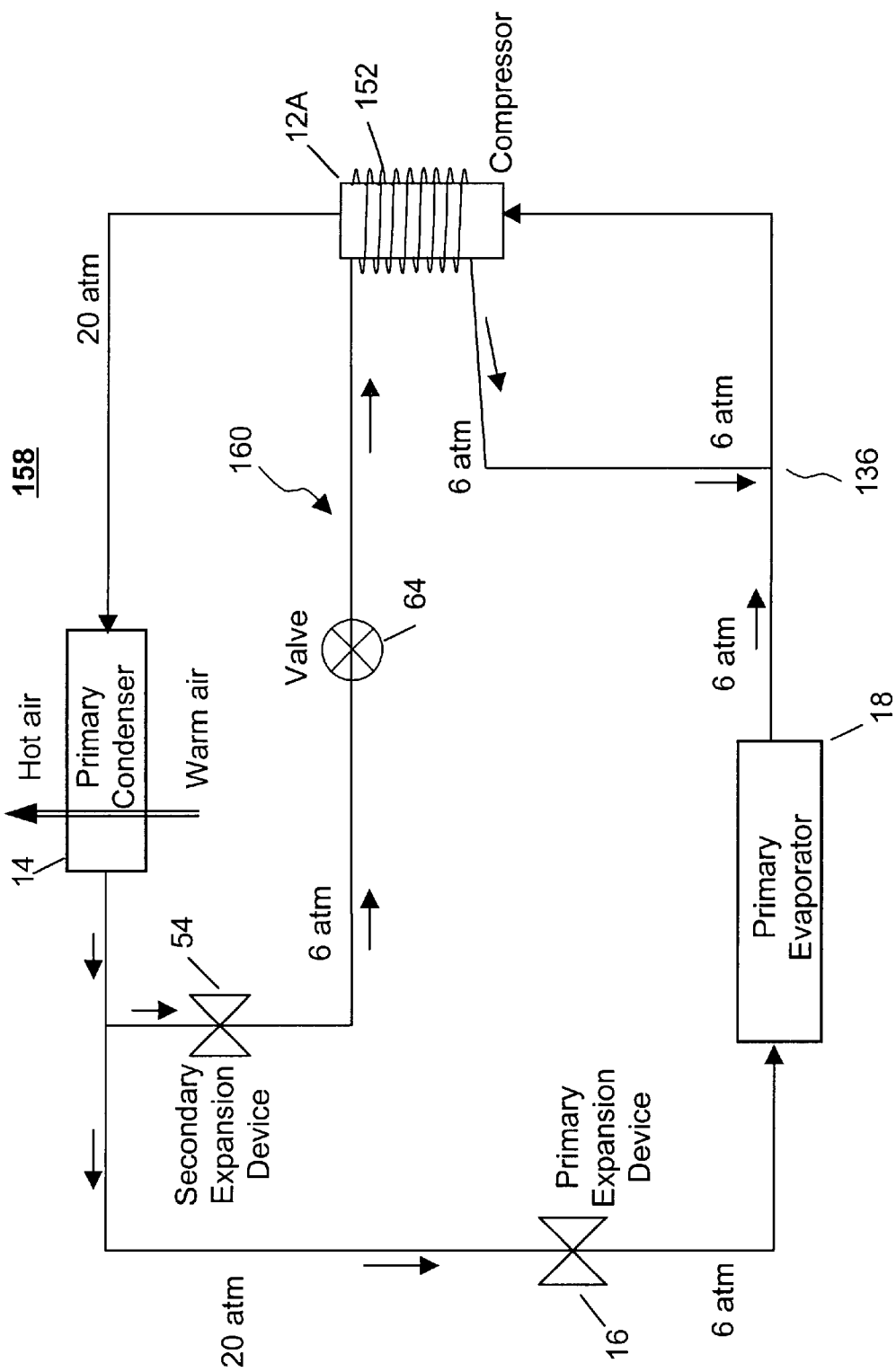
FIG. 14 shows a block diagram of a sixth embodiment of the invention in which the bypass path is configured as in the fourth embodiment, but in which the heat exchanger operates to remove heat from the refrigerant at the compressor instead of at the condenser.

FIG. 14 illustrates a sixth embodiment, generally denoted at 158, in which the pressure at the bypass path is maintained at the same level as the pressure at the evaporator, for example, 6 atm in the case of R-22 refrigerant. Thus, neither a vacuum generating device nor a capillary tube is required. The amount of the refrigerant in the bypass path 160 is varied using a valve 64, thus varying the cooling capacity. As in the fifth embodiment, this embodiment uses a heat exchanger coil 152 wrapped around the cylindrical casing of a compressor 12A to remove heat from the refrigerant at the compressor.

Figure 15:
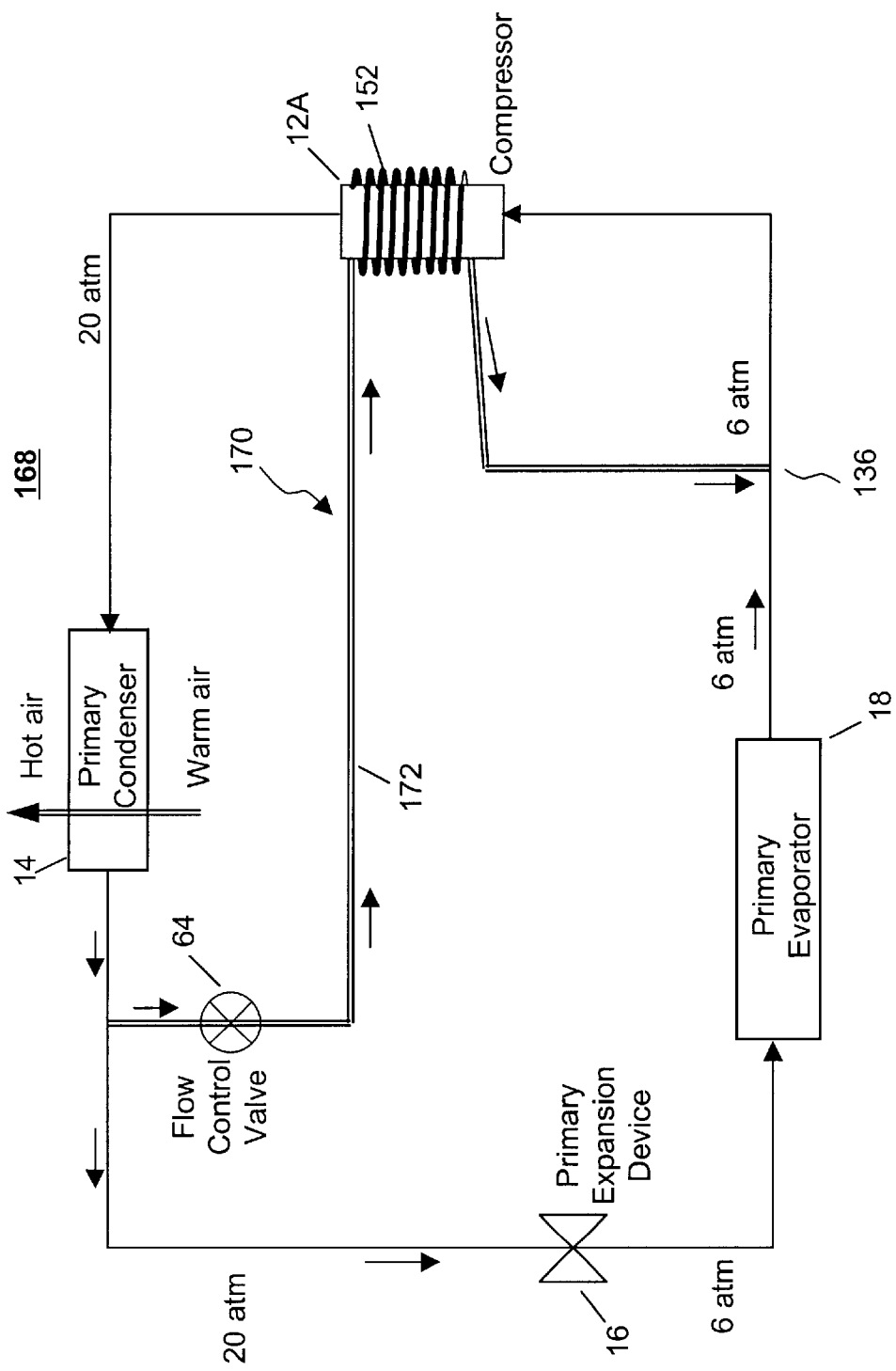
FIG. 15 shows a block diagram of a seventh embodiment of the invention in which the bypass path is configured as in the fifth embodiment, but in which the bypass path includes a capillary tube which functions as a secondary expansion device, a heat exchanger, and a pressure differential accommodating device.

FIG. 15 illustrates a seventh embodiment, generally denoted at 168, in which the bypass path 170 is comprised of a flow control valve 64, and an elongated capillary tube 172, which functions as both a secondary expansion device and a pressure differential accommodating device. Using R-22 refrigerant, for example, the pressure in the bypass path gradually decreases from 20 atm at the exit of the condenser to 6 atm at the exit of the evaporator.

As in the case of the fifth and sixth embodiments, a portion of capillary tube 172 is wrapped around the housing of compressor 12A to remove heat from the refrigerant at the compressor.

A system constructed according to the seventh embodiment can be assembled quite inexpensively.

Various other features, may also be provided. For example, in the first embodiment shown in FIGS. 5–7, different thresholds for increasing and decreasing the cooling capacity may be selected. In that case, when the heat load exceeds the upper threshold, the system operates in accordance with the configuration of FIG. 6. When the heat load is below the lower threshold, the system operates according to the configuration of FIG. 7. Between the two thresholds, all of valves 64, 66, and 70 and secondary expansion device 54 are closed and the system configuration is the same as that of the conventional system shown in FIG. 1.

A feature common to all of the embodiments described above is that it is possible to control the decrease in cooling capacity in such a way that continuous (or stepwise) decreases may be obtained as the heat load drops below the predetermined threshold. In the embodiment of FIGS. 5–7, it is also possible to progressively increase the cooling capacity as the heat load increases. Referring to FIG. 6, the valve controller may be programmed to progressively open valve 64 from its fully closed condition at the predetermined threshold in a continuous or stepwise manner as a function of the heat load until it is fully opened. Similarly, the valve controller may be programmed to open one of valves 66 or 70 fully at the predetermined threshold, and to progressively open the other one of the two in a continuous or stepwise manner to its fully opened condition as a function of increasing heat load. As will be appreciated, controlling the valves in the manner indicated varies the refrigerant flow through heat exchanger 56 thereby adjusting the cooling capacity and resulting in a higher SEER.

With respect to the embodiments of FIGS. 10–15, it will be appreciated that since there is no enhanced cooling capacity, only valve 64 is progressively adjustable to decrease the cooling capacity below the predetermined threshold.

As yet a further variation, principles of this application are applicable to regenerative mixed refrigerant systems which provide higher evaporator efficiency by increasing the percentage of liquid in the refrigerant as it enters the evaporator. Such systems are disclosed, for example, in our U.S. Pat. Nos. 6,250,086 and 6,232,101, the contents of which are hereby incorporated by reference.

In summary, use of a refrigerant bypass path allows creation of a variable capacity system that avoids the need for continuously cycling the compressor on and off, but does not require an expensive inverter compressor, and does not exhibit the low EER associated with high compressor speeds.

In describing the invention, specific terminology has been employed for the sake of clarity. However, the invention is not intended to be limited to the specific descriptive terms, and it is to be understood that each specific term includes all technical equivalents that operate in a similar manner to accomplish a similar purpose.

Similarly, the embodiments described and illustrated are also intended to be exemplary, and various changes and modifications, and other embodiments within the scope of the invention will be apparent to those skilled in the art in light of the disclosure. The scope of the invention is therefore intended to be defined and limited only by the appended claims, and not by the description herein.

What is claimed is:

1. A variable cooling capacity refrigeration system comprising:
   a primary refrigerant path including a constant speed compressor that operates continuously when the system is energized, irrespective of the heat load, a primary condenser, a primary expansion device, and a primary evaporator;
   a refrigerant bypass path including a secondary expansion device, a heat exchanger, and a flow controller,
   the flow controller being operable, when the heat load is above a predetermined high heat load threshold, to provide a first cooling capacity, and, when the heat load is not above the predetermined high heat load threshold, to reduce a the cooling capacity to a level below the first cooling capacity.

2. A refrigeration system according to claim 1, wherein, as the heat load falls below the high heat load threshold, the flow controller is operative progressively to reduce the cooling capacity.

3. A refrigeration system according to claim 2, wherein, as the heat load rises above the high heat load threshold, the flow controller is operative progressively to increase the cooling capacity.

4. A refrigeration system according to claim 1, wherein:
   when the heat load is below a predetermined low heat load threshold, the flow controller is operable to provide a second cooling capacity having a maximum value which is below the first cooling capacity; and
   when the heat load is intermediate the high and low heat load thresholds, the flow controller is operable to provide a third cooling capacity which is intermediate the first and second cooling capacities.

5. A refrigeration system according to claim 1, wherein, when the heat load is not above the high heat load threshold, the flow controller operates the heat exchanger as a secondary evaporator.

6. A refrigeration system according to claim 5, wherein, when the heat load is above the high heat load threshold, the flow controller operates the heat exchanger as a secondary condenser.

7. A refrigeration system according to claim 1, wherein, when the heat load is not above the high heat load threshold, the heat exchanger is operative to remove heat from refrigerant as it flows through the primary condenser.

8. A refrigeration system according to claim 7, wherein, when the heat load is above the high heat load threshold, heat exchanger is operative to remove heat from a portion of the refrigerant that has been delivered to the primary refrigerant path from the compressor.

9. A refrigeration system according to claim 1, wherein, when the heat load is not above the high heat load threshold, the heat exchanger is operative to remove heat from refrigerant as it flows through the compressor.

10. A refrigeration system according to claim 1, wherein, when the heat load is not above the high heat load threshold, the flow controller is operative to reduce the cooling capacity by diverting a portion of the refrigerant exiting from the condenser to flow through the bypass path to an inlet of the compressor.

11. A refrigeration system according to claim 1, wherein, when the heat load is above the high heat load threshold, to prevent refrigerant exiting from the condenser from flowing through the bypass path to the compressor inlet.

12. A refrigeration system according to claim 10, wherein, when the heat load is above the high heat load threshold, the flow controller is operative to increase the cooling capacity by diverting a portion of the refrigerant exiting from the compressor to flow through the bypass path to the primary expansion device.

13. A refrigeration system according to claim 1, wherein, when the heat load is not above the high heat load threshold:
   the pressure of the refrigerant in the heat exchanger is maintained above the refrigerant pressure in the primary evaporator; and
   the bypass path includes a pressure differential accommodating device operative to reduce the pressure of the refrigerant exiting the heat exchanger.

14. A refrigeration system according to claim 13, wherein the heat exchanger is thermally coupled to the compressor, whereby, when the heat load is not above the high heat load threshold, the heat exchanger provides subcooling for refrigerant as it passes through the compressor.

15. A refrigeration system according to claim 13, wherein the pressure differential accommodating device is a vacuum generator.

16. A refrigeration system according to claim 13, wherein the pressure differential accommodating device is a venturi tube.

17. A refrigeration system according to claim 13, wherein the pressure differential accommodating device is a flow restrictor.

18. A refrigeration system according to claim 13, wherein the pressure differential accommodating device is a vortex generator.

19. A refrigeration system according to claim 1, further comprising an air flow device that directs warm air to the heat exchanger and directs chilled air from the heat exchanger to the condenser when the heat load is not above the high heat load threshold, whereby the heat exchanger provides subcooling for refrigerant as it passes through the primary condenser.

20. A refrigeration system according to claim 1, wherein the heat exchanger is thermally coupled to the compressor, whereby, when the heat load is not above the high heat load threshold, the heat exchanger removes heat from the refrigerant as it passes through the compressor.

21. A refrigeration system according to claim 20, wherein the heat exchanger is comprised of an extended length of capillary tubing in thermal contact with a casing portion of the compressor.

22. A refrigeration system according to claim 1, wherein the secondary expansion device and the heat exchanger are comprised of an extended length of capillary tubing.

23. A refrigeration system according to claim 22, wherein a portion of capillary tubing is thermally coupled to a casing portion of the compressor.

24. A variable cooling capacity refrigeration system comprising:
   a primary refrigerant path including a constant speed compressor that operates continuously when the system is energized irrespective of the heat load, a primary condenser, a primary expansion device, and a primary evaporator;
   a secondary refrigerant path including a secondary expansion device, a heat exchanger, and a first valve;
   the heat exchanger being connected at a first end to an outlet of the primary condenser, and being connected at a second end to an inlet of the compressor; and a controller that opens the first valve to permit a portion of the refrigerant exiting from the condenser to flow through the bypass path to the compressor inlet when the heat load is below a predetermined high heat load threshold, and closes the first valve to prevent refrigerant exiting from the condenser from flowing through the bypass path to the compressor inlet when the heat load is not below the high heat load threshold.

25. A refrigeration system according to claim 24, further comprising an air flow device that directs warm air to the heat exchanger and directs chilled air from the heat exchanger to the condenser when the heat exchanger is operating as a secondary evaporator.

26. A refrigeration system according to claim 24, wherein the controller is operable to progressively open the first valve from a minimum open position to a maximum open position as the heat load decreases below the high heat load threshold.

27. A refrigeration system according to claim 24, wherein:
the secondary expansion devices couples the outlet of the primary condenser to the first end of the heat exchanger; and the controller is further operable to open the secondary expansion device when the heat load is below the predetermined high heat load threshold, and to close the secondary expansion device when the heat load is not below the high heat load threshold.

28. A refrigeration system according to claim 24, wherein, when the heat load is below the high heat threshold:
the refrigerant outlet pressure at the second end of the heat exchanger is greater than the pressure at the outlet of the primary evaporator; and
the bypass path includes a pressure differential accommodating device operative to reduce the pressure of the refrigerant at the second end of the heat exchanger.

29. A refrigeration system according to claim 28, wherein the pressure differential accommodating device is a venturi tube having a high pressure inlet connected to the second end of the heat exchanger, a low pressure inlet connected to an outlet of the primary evaporator, and an outlet connected to the compressor inlet.

30. A refrigeration system according to claim 28, wherein the pressure differential accommodating device is a flow restrictor connected at one end to the second end of the heat exchanger through the first valve, and connected at a second end to the compressor inlet.

31. A refrigeration system according to claim 28, wherein the pressure differential accommodating device is a vortex generator having a high pressure inlet connected to the second end of the heat exchanger, a low pressure inlet connected to an outlet of the primary evaporator, and an outlet connected to the compressor inlet.

32. A refrigeration system according to claim 24, further including:
a second valve connected between an outlet of the compressor and the second end of the heat exchanger; and
a third valve connected between the first end of the heat exchanger and an inlet of the primary expansion device; and
wherein the controller is further operable to open the second and third valves to permit a portion of the refrigerant exiting from the compressor to flow through the heat exchanger from the second end to the first end and to enter the primary evaporator through the primary expansion device when the heat load is not below the high heat load threshold.

33. A refrigeration system according to claim 32, further including an air flow device that directs warm air to the heat exchanger and directs chilled air from the heat exchanger to the condenser when the heat load is below the high heat load threshold.

34. A refrigeration system according to claim 32, wherein the heat transfer capacity of the heat exchanger is less than that of the primary condenser.

35. A refrigeration system according to claim 32, wherein the controller is operable to open the secondary expansion device, to close the second and third valves, and to progressively open the first valve from a minimum open position to a maximum open position as the heat load decreases below the high heat load threshold, and to close the secondary expansion device, to close the first valve, and to progressively open at least one of the second and third valves from a minimum open position to a maximum open positions as the heat load increases above the high heat load threshold.

36. A refrigeration system according to claim 32, wherein, when the heat load is below the high heat load threshold:
the refrigerant outlet pressure at the second end of the heat exchanger is greater than the pressure at the outlet of the primary evaporator; and
the bypass path includes a pressure differential accommodating device operative to reduce the pressure of the refrigerant at the second end of the heat exchanger.

37. A refrigeration system according to claim 36, wherein the pressure differential accommodating device is a venturi tube having a high pressure inlet connected to the second end of the heat exchanger through the first valve, a low pressure inlet connected to an outlet of the primary evaporator, and an outlet connected to the compressor inlet.

38. A refrigeration system according to claim 36, wherein the pressure differential accommodating device is a capillary tube connected at a first end to the second end of the heat exchanger through the first valve, and connected at a second end to the compressor inlet.

39. A refrigeration system according to claim 36, wherein the pressure differential accommodating device is a vortex generator having a high pressure inlet connected to the second end of the heat exchanger through the first valve, a low pressure inlet connected to an outlet of the primary evaporator, and an outlet connected to the compressor inlet.

40. A refrigeration system according to claim 24, wherein:
when the heat load is not below the high heat load threshold, the controller is operable to provide a first cooling capacity;
when the heat load is below a predetermined low heat load threshold, the controller is operable to provide a second cooling capacity having a maximum valve which is below the first cooling capacity; and
when the heat load is intermediate the high and low heat load thresholds, the controller is operable to provide a third cooling capacity which is intermediate the first and second cooling capacities.

41. A refrigeration system according to claim 24, wherein the heat exchanger is thermally coupled to the compressor, whereby, when the heat load is below the high heat load threshold, the heat exchanger removes heat from the refrigerant as it passes through the compressor.

42. A refrigeration system according to claim 41, wherein the heat exchanger is comprised of an extended length of capillary tubing in thermal contact with a casing portion of the compressor.

43. A refrigeration system according to claim 24, wherein the secondary expansion device and the heat exchanger are comprised of an extended length of capillary tubing.

44. A refrigeration system according to claim 43, wherein a portion of capillary tubing is thermally coupled to a casing portion of the compressor.

45. A method of operating a refrigeration system to improve the SEER, the refrigeration system being comprised of a compressor, a condenser, an expansion device and an evaporator, all connected in a closed system with refrigerant flowing therethrough, the method comprising the steps of:

operating the compressor continuously at a constant speed when the system is energized, irrespective of the heat load;

providing a refrigerant bypass path including a secondary expansion device, a heat exchanger, and a flow controller; and providing a first cooling capacity when heat load is above a predetermined high heat load threshold by permitting a portion of the refrigerant exiting from the condenser to flow through the bypass path to an inlet of the compressor;

providing a second reduced cooling capacity when the heat load is not above the high heat load threshold.

46. A method according to claim 45, further including the step of directing warm air to the heat exchanger and chilled air from the heat exchanger to the condenser when the heat load is below the high heat load threshold.

47. A method according to claim 45, further including the step of progressively increasing the refrigerant flow through the bypass path from a minimum value to a maximum value as the heat load decreases below the high heat load threshold.

48. A method according to claim 45, further including the steps of:

opening the secondary expansion device when the heat load is not above high heat load threshold; and closing the secondary expansion device when the heat load is above the predetermined high heat load threshold.

49. A method according to claim 45, which, when the heat load is not above the high heat load threshold, further includes the steps of:

maintaining a differential between the pressure of the refrigerant exiting the heat exchanger and the pressure of the refrigerant exiting the evaporator; and accommodating the pressure differential by passage of at least the refrigerant outflow from the heat exchanger through a pressure differential accommodating device.

50. A method according to claim 49, wherein:

the pressure differential is accommodated by delivering refrigerant from the heat exchanger into a high pressure inlet of a vacuum generating device;

delivering refrigerant exiting the evaporator to a low pressure inlet port of the vacuum generating device; and delivering refrigerant outflow from an outlet of the vacuum generating device to a compressor inlet.

51. A method according to claim 50, wherein the vacuum generating device is a venturi tube.

52. A method according to claim 50, wherein the vacuum generating device is a vortex generator.

53. A method according to claim 49, wherein the pressure differential accommodating device is a flow restrictor connected between the heat exchanger and an inlet of the compressor.

54. A method according to claim 45, further including the step of delivering a portion of the refrigerant exiting from the compressor through the bypass path to the primary expansion device when the heat load is above the high heat load threshold.

55. A method according to claim 54, further including the steps of:

directing warm air to the heat exchanger; and directing chilled air from the heat exchanger.

56. A method according to claim 54, further including the step of progressively increasing the refrigerant flow through the bypass path from a minimum value to a maximum value as the heat load increases above the high heat load threshold.

57. A method according to claim 54, further including the steps of:

opening the secondary expansion device when the heat load is not above the high heat load threshold; and closing the secondary expansion device when the heat load is above the high heat load threshold.

58. A method according to claim 54, which, when the heat load is not above the high heat load threshold, further includes the steps of:

maintaining a differential between the pressure of the refrigerant exiting the heat exchanger and the pressure of the refrigerant exiting the evaporator; and accommodating the pressure differential by passage of at least the refrigerant outflow from the heat exchanger through a pressure differential accommodating device.

59. A method according to claim 58, wherein:

the pressure differential is accommodated by delivering refrigerant from the heat exchanger into a high pressure inlet of a vacuum generating device;

delivering refrigerant exiting the evaporator to a low pressure inlet port of the vacuum generating device; and delivering refrigerant outflow from an outlet of the vacuum generating device to a compressor inlet.

60. A method according to claim 59, wherein the vacuum generating device is a venturi tube.

61. A method according to claim 59, wherein the vacuum generating device is a vortex generator.

62. A method according to claim 58, wherein the pressure differential accommodating device is a flow restrictor connected between the heat exchanger and an inlet of the compressor.

63. A method according to claim 45, which:

when the heat load is below a predetermined low heat load threshold, further includes the step of providing a second cooling capacity having a maximum valve which is below the first cooling capacity; and when the heat load is intermediate the predetermined high and low heat load thresholds, further includes the step of providing a third cooling capacity which is intermediate the first and second cooling capacities.

64. A method according to claim 45, which, when the heat load is not above the predetermined high heat load threshold, further includes the step of removing heat from the refrigerant as it passes through the compressor by thermally coupling the heat exchanger to the compressor.

65. A method according to claim 64, wherein the thermal coupling is provided by forming the heat exchanger of an extended length of capillary tubing, and mounting the capillary tubing in thermal contact with a casing portion of the compressor.

66. A refrigeration system according to claim 45, wherein the bypass path is provided by forming the secondary expansion device and the heat exchanger of an extended length of capillary tubing.

67. A refrigeration system according to claim 66, wherein a portion of the capillary tubing is thermally coupled to a casing portion of the compressor.

* * * * *

UNITED STATES PATENT AND TRADEMARK OFFICE
CERTIFICATE OF CORRECTION

PATENT NO.    : 6,651,451 B2  
DATED         : November 25, 2003  
INVENTOR(S)   : Young I. Cho et al.

It is certified that error appears in the above-identified patent and that said Letters Patent is hereby corrected as shown below:

<u>Title page,</u>  
Item [75], Inventors, the first inventor's name should be changed from "T" to -- I --; or Young I. Cho --

Signed and Sealed this

Twentieth Day of April, 2004

JON W. DUDAS  
*Acting Director of the United States Patent and Trademark Office*